United States Patent [19]
Yasui

[11] Patent Number: 5,850,722
[45] Date of Patent: Dec. 22, 1998

[54] LIGHTWEIGHT SUPERPLASTICALLY FORMED, DIFFUSION BONDED PANEL STRUCTURE AND PROCESS OF MANUFACTURE

[75] Inventor: Ken K. Yasui, Huntington Beach, Calif.

[73] Assignee: McDonnell Douglas Corporation, Huntington Beach, Calif.

[21] Appl. No.: 721,481

[22] Filed: Sep. 27, 1996

[51] Int. Cl.⁶ ............................. B32B 3/12; E04C 2/08; E04C 2/36

[52] U.S. Cl. .................. 52/793.11; 52/793.1; 52/801.1; 52/790.1

[58] Field of Search .................. 52/793.1, 793.11, 52/790.1, 801.1

[56] References Cited

U.S. PATENT DOCUMENTS

| | | |
|---|---|---|
| 4,351,470 | 9/1982 | Swadling et al. . |
| 4,393,987 | 7/1983 | Anderson et al. . |
| 4,406,393 | 9/1983 | Ascani, Jr. et al. . |
| 4,411,380 | 10/1983 | McWithey et al. . |
| 4,422,569 | 12/1983 | Payne et al. . |
| 4,599,771 | 7/1986 | Trenkler et al. . |
| 4,632,296 | 12/1986 | Mansbridge et al. . |
| 5,330,092 | 7/1994 | Gregg et al. . |
| 5,366,787 | 11/1994 | Yasui et al. ................ 52/793.11 X |

*Primary Examiner*—Christopher Kent
*Attorney, Agent, or Firm*—Bell Seltzer Intellectual Property Law Group of Alston & Bird LLP

[57] ABSTRACT

A method to increase the damage resistance of a diffusion bonded panel that includes embedding reinforcing members in the panel are bonding the reinforcing members so structural redundancy occurs adjacent the bonds and the structures constructed thereby. The reinforcing members stop cracking of the panel there across by taking on the load at the end of the crack so crack growth is retarded.

21 Claims, 11 Drawing Sheets

LIGHTWEIGHT SUPERPLASTICALLY FORMED, DIFFUSION BONDED PANEL STRUCTURE AND PROCESS OF MANUFACTURE

FIELD OF THE INVENTION

This invention relates to the field of metal forming and, more particularly, to the forming and diffusion bonding of light weight panels reinforced by elements that do not form a continuous diffusion bond with the panels to prevent cracks from propagating therethrough.

BACKGROUND OF THE INVENTION

Superplasticity is the characteristic demonstrated by certain metals which exhibit extremely high plasticity. They develop high tensile elongations with minimum necking when formed within specific temperature ranges and limited strain rate ranges. The methods used to form and in some cases diffusion bond superplastic materials capitalize on these characteristic and typically employ gas pressure to form sheet material into or against a configurational die in order to form the part. Diffusion bonding is frequently associated with the process. U.S. Pat. No. 3,340,101 to D. S. Fields, Jr. et al.; U.S. Pat. No. 4,117,970 to Hamilton et al.; U.S. Pat. No. 4,233,829 to Hamilton et al.; and U.S. Pat. No. 4,217,397 to Hayase et al. are all basic patents, with various degrees of complexity, relating to superplastic forming. All of these references teach a process which attempts to control stress, and thereby strain, by controlling the pressure in the forming process versus time.

As shown in Hayase, et al., U.S. Pat. No. 4,217,397, four sheets of superplastically formable material, such as titanium alloy can be used to form a metallic sandwich structure. Generally, two or three contiguous work sheets are joined together by a distinct continuous seam weld in a pre-selected pattern, which determines the geometry of the structure of the core to be produced. Two expandable sheets are added to both sides of the seam welded core sheets and sealed around the perimeter by welding. The assembly is then placed in a limiting fixture or die. The space between the upper and lower limiting fixture members determines the height and shape of the sandwich structure that ultimately results. At least one of the work sheets is then superplastically formed against the other work sheet, to which it becomes diffusion-bonded to form the desired sandwich structure.

A particularly advantageous structure that can be formed is a four-sheet structure (two face sheets and two core sheets) that ultimately results in two generally parallel face-sheets with perpendicular webs extending there between. The face sheets, are formed first and held in a proper final position inside forming dies in a hot press by pressure applied between the core sheets and the face sheets, while pressure is also applied between the core sheets to prevent them from bonding together. The webs are then formed by increasing the pressure between the two core sheets. The core sheets are welded together along seams there between, with at least one area of each seam where the weld is interrupted so that gas can pressure equalize between the welded core sheets. When pressurized during a superplastic forming operation, the spaces between the seams of the two core sheets expand into balloon-like structures until they contact the face sheets and can expand outwardly no further. Application of continuing pressure causes the balloon-like structures to assume square shapes with the seams being positioned halfway between the face sheets on what become perpendicular webs. The core sheet portions adjacent the webs ultimately are formed 90° into contact with each other, and diffusion-bonded together into a single web structure. Additional core sheets can be included to form diagonal reinforcing ribs, and portions can be reinforced by suitably placed doubler strips and other reinforcements.

These superplastically formed and diffusion bonded (SPF/DB) panel structures are efficient load-carrying structures. However, their durability and damage tolerance properties are not good, because SPF/DB components are joined by either diffusion bonding or metallurgical fusion. Fatigue and/or damage cracks can propagate through these bonded or fused joints unlike built-up structures joined by fasteners. The solution heretofore has been to build SPF/DB panels out of sheet gauges much thicker than are needed so that fatigue cracks do not start. Cracks starting from inflight damage, heretofore have been addressed by not using SPF/DB panels in load critical areas, if at all.

Therefore, there has been a need to provide means to retard crack propagation through SPF/DB structures.

SUMMARY OF THE INVENTION

In accordance with the present invention, diffusion bondable strip assemblies, or curved, threaded, or roughened non-diffusion bondable metal wires or non-metallic high modulus members are placed at strategic locations parallel or perpendicular to the webs of an SPF/DB panel during fabrication. The strip assemblies usually are positioned on a face sheet whereas the wires and members may be placed either along a face sheet or in the webs.

The strip assemblies include two or more layers, bonded at staggered locations to each other and the panel. Usually any crack that starts in the panel, stops when it reaches the strip assembly, because the strip assembly takes on the load. If the crack happens to grow into an area where the panel is bonded to a strip, the crack will extend into the bonded strip, but the adjacent strip, bonded at different locations will take the load to retard crack growth. Since at least a portion of the strip assembly will carry the load at both sides of the cracked area, the durability and damage tolerance properties of the panel are improved.

Preferably the wires or members are constructed from high tensile strength and modulus material that does not diffusion bond at the temperatures normally employed to bond SPF/DB panels. The wires or other high modulus members are positioned between the core sheet and face sheet, and are mechanically retained in position in the completed structure by their non-linear shapes or surface roughness. When a crack starts to propagate across a wire or member, it transmits the load at the cracked area and retards crack propagation.

The present invention can be used with many different types of SPF/DB panels, and can be used in areas of critical stress with an orientation that retards crack growth.

It therefore is an object of the present invention to provide a method and structures for retarding the propagation of cracks in SPF/DB structures so such structures do not have to be overdesigned to prevent any crack from appearing.

Another object of this invention is to locally strengthen SPF/DB structures.

Another object is to provide means to manufacture composite titanium SPF/DB structures.

Another object is to provide light weight SPF/DB structures that are tolerant of physical damage.

These and other objects and advantages of the present invention will become apparent to those skilled in the art after considering the following detailed specification, together with the accompanying drawings wherein:

BRIEF DESCRIPTION OF THE DRAWINGS

FIG. 28 is a perspective view of two pairs of the core sheets of FIG. 27 as they are welded together to form a core assembly for the panel of FIG. 25 with the pressure equalizing holes of the present invention formed there through;

DETAILED DESCRIPTION OF THE SHOWN EMBODIMENTS

Figure 1:
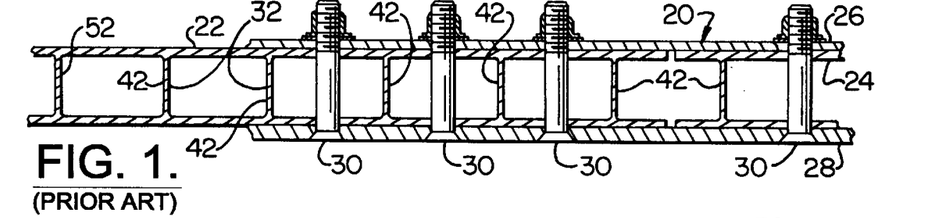
FIG. 1 is a cross-sectional view of a bolted joint between the edges of two prior art SPF/DB four-sheet panels.

Referring to the drawings more particularly by reference numbers, number 20 in FIG. 1 refers to a joint between two prior art four sheet superplastically formed, diffusion bonded (SPF/DB) panels 22 and 24 held edge to edge by doubler plates 26 and 28 and suitable fasteners 30. The prior art four sheet SPF/DB process produces relatively thin webs 32 unless the starting sheets are excessively thick. The starting sheet thickness for the thin webs 32 is chosen based on the strength requirements of the panels 22 and 24. If they are thick enough to withstand the compressive loads generated by the fasteners 30 at the joint 20, the panels 22 and 24 become too heavy to be efficient panel structures for supersonic aerospace vehicles, where they are planned for use. Such panels 22 and 24 have little resistance to the propagation of cracks there through except at the joint 20 where the fasteners distribute the load, transfer it to the doubler plates 26 and 28 and back to the adjacent panel. Each of the panels 22 or 24 is an integral structure, so once a crack starts, high localized stresses at the end of the crack cause the crack to propagate through the panel. In conventional panels built up with separate members and fasteners, redundant independent structure can be made to take the loads to retard crack growth.

The material of the sheets used to superplastically form the panels 22 and 24 must exhibit the characteristic of unusually high tensile elongation with minimum necking when formed within a limited temperature and strain rate range. Several kinds of materials demonstrate these superplastic properties. Titanium alloys are the preferred sheet material although some alloys of aluminum are also superplastically formable. The superplastic temperature range varies with the specific alloy used. This temperature for most modern titanium alloys is about 1650° F. The optimum rate is usually determined experimentally for each alloy and controlled by using a controlled gas-mass flow method. If the strain rate is too rapid the sheet material being formed will blow out and if the rate is too slow the material looses some of its plasticity, and the process costs are increased by excessive labor and energy usage, and the reduced production availability of expensive hot press resources. The sheets must be suitable for diffusion bonding. Diffusion bonding refers to the solid state joining of surfaces of similar or dissimilar metals by applying heat and pressure for a time duration long enough to cause co-mingling of the atoms at the joint interface. This is distinguished from fusion bonding or welding, which is the metallurgical joining or welding of surfaces of similar or dissimilar metals by applying enough heat to cause the materials at the joint interface to reach a liquid state and thereby merge into an integral solid when cool.

Figure 2:
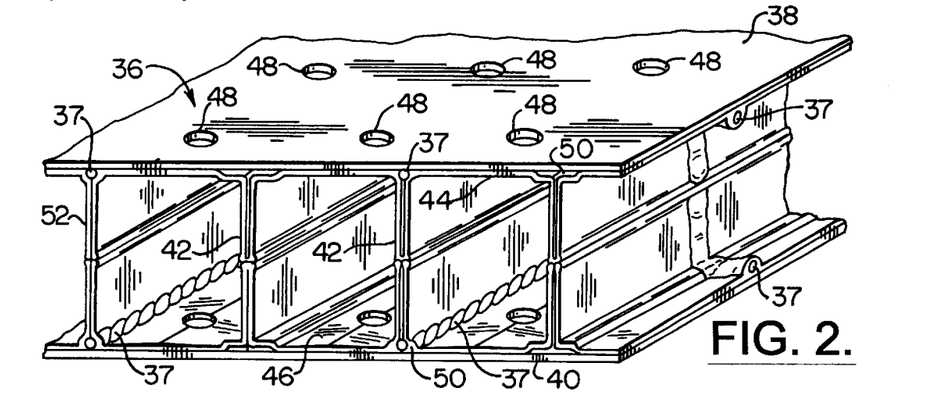
FIG. 2 is a perspective view of a four-sheet panel portion similar to those shown in FIG. 1 including reinforced webs so that the compression of a bolted joint can be accommodated and crack retardation wires of the present invention.

The panel structure 36 of FIG. 2 is constructed in accordance with the present invention and is shown with the sheets from which it is formed even though when the panel structure 36 is formed, all of the sheets are diffusion bonded together into an integral structure that surrounds crack retardation wires 37. Although referred to as wires, the "wires" may be high modulus non-metallic members. The panel structure 36 includes parallel face sheets 38 and 40 with thick webs 42 made from core sheets 44 and 46 extending between the face sheets 38 and 40 in areas where fastener holes 48 are formed for fasteners used to form an edge joint. Doubler strips 50 are included with the thick webs 42 to reinforce them while normal thinner webs 52 do not include the doubler strips 50. As shown, it is convenient to supply some doubler strips 50a with the reinforcing wires 37 embedded therein.

Figure 3:
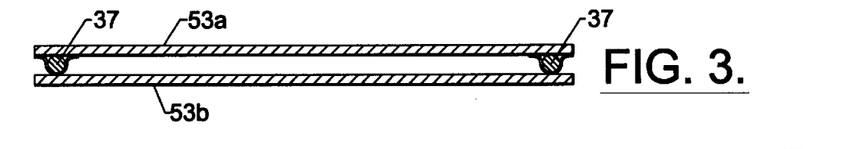
FIG. 3 is a cross-sectional view of a doubler strip assembly pack before superplastic forming and diffusion bonding.
Figure 4:
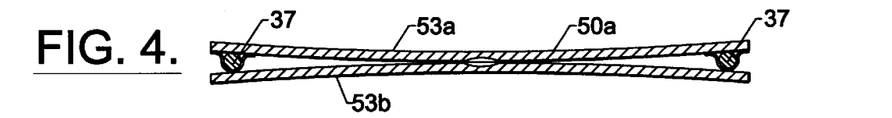
FIG. 4 is a cross-sectional view of the doubler strip of FIG. 3 after it has been formed and bonded about crack retardation wires.

The reinforced doubler strips 50a are constructed by placing the wires 37 between two thin strips 53a and 53b, which are then attached together such as by light spot welding to hold the wires frictionally in position, as shown in FIGS. 3 and 4.

Figure 5:
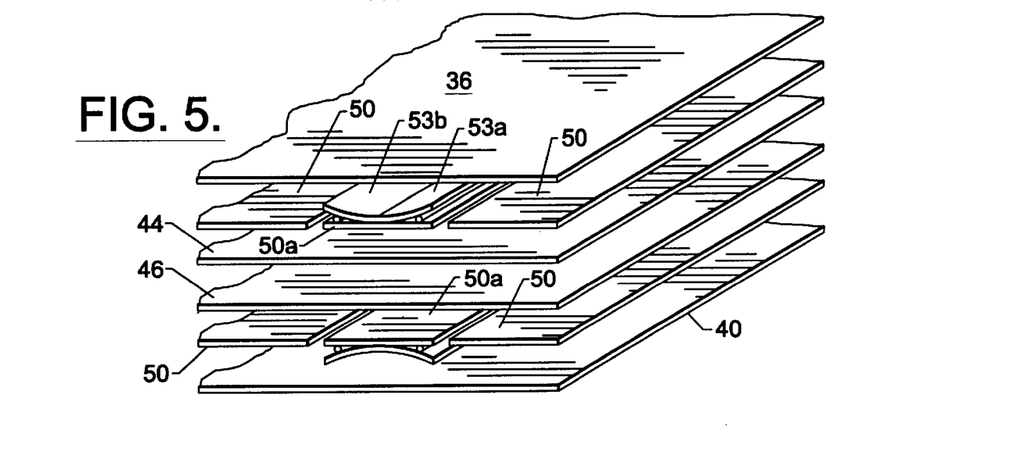
FIG. 5 is an exploded cross-sectional view of a four-sheet pre-assembly with doubler strips and crack retardation wires, used to form the panel of FIG. 2.
Figure 6:
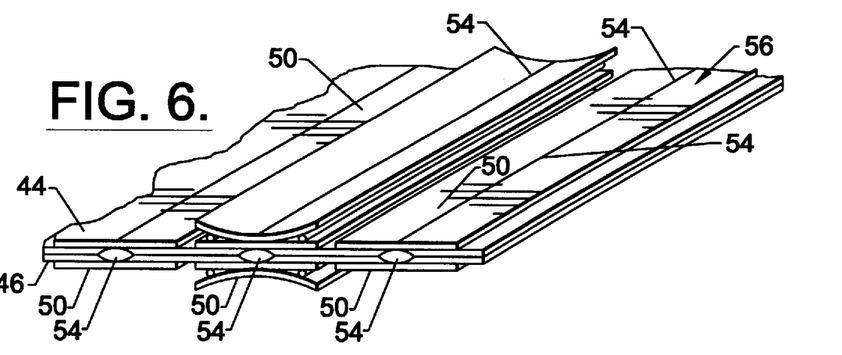
FIG. 6 is a cross-sectional view of the welded core sheet assembly with doubler strips of FIG. 4.
Figure 7:
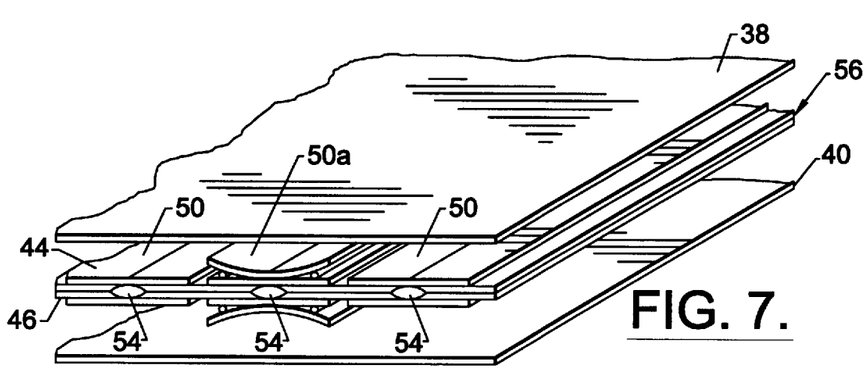
FIG. 7 is an exploded cross-sectional view of the welded core sheet assembly of FIG. 6 in position between two face sheets.
Figure 8:
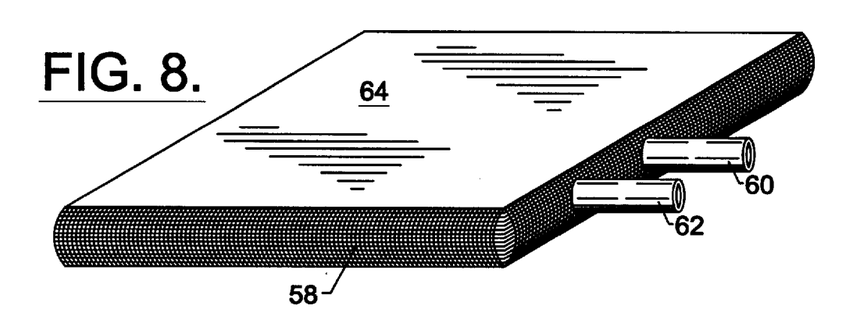
FIG. 8 is a perspective view of the assembly of FIG. 7 with its edges sealed by welding and with pressure tubes installed.
Figure 9:
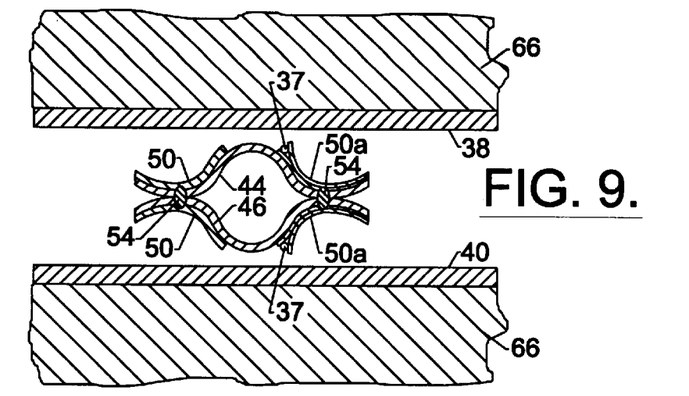
FIG. 9 is an enlarged cross-sectional view of a portion of the assembly of FIG. 8 as the panel is being formed.

To construct the panel structure 36, the face sheets 38 and 40, the core sheets 44 and 46, and the doubler strips 50 and 50a are assembled as shown in FIG. 5 with the core sheets 44 and 46 adjacent each other and doubler strips 50 outside the core sheets 44 and 46. As shown in FIG. 6, core sheets 44 and 46 and the doubler strips 50 and 50a are connected by linear welds 54 into a core assembly 56, the linear welds 54 being produced by means such as a rollseam welder. The welds 54 may be intermittent to allow gas flow between the mating surfaces of the core sheets 44 and 46. The core assembly 56 is then positioned between the face sheets 38 and 40 (FIG. 7), and the edges 58 are welded (FIG. 8). A first tube 60 is manifolded to transmit inert gas between the face sheets 38 and 40 and the core assembly 56. A second tube 62 is connected through the edge 58 to transmit inert gas between the core sheets 44 and 46. The panel construction assembly 64 is then placed between dies 66 and heated to approximately 1650° F. Pressurized inert gas is introduced between the face sheets 38 and 40, and the core sheets 44 and 46. This causes the face sheets 38 and 40 to superplastically form outwardly as shown in FIG. 9 into the shape of the dies 66. During expansion of the face sheets 38 and 40, a slightly higher pressure is applied between the core sheets 44 and 46 through tube 62 so that the core sheets 44 and 46 move only a minimum amount and do not diffusion bond together.

Figure 10:
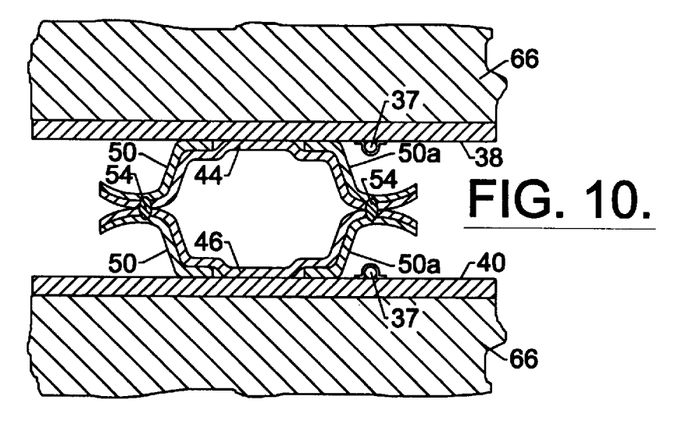
FIG. 10 an enlarged cross-sectional view of the portion of the assembly of FIG. 8 as the panel is further along in it forming process than is shown in FIG. 9.
Figure 11:
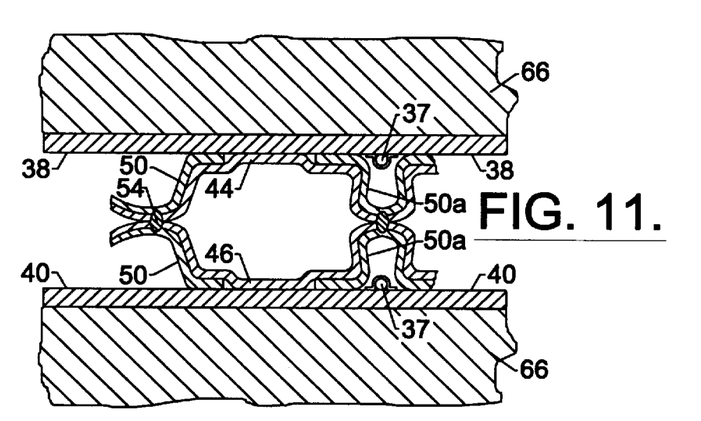
FIG. 11 is an enlarged cross-sectional view of the portion of the assembly of FIG. 8 as the panel is further along in its forming process than is shown in FIG. 10.

Once the face sheets 38 and 40 have reached their final positions against the die 66, the pressure of the inert gas between the face sheets 38 and 40 and the core sheets 44 and 46 is held at a value sufficient to maintain the face sheets 38 and 40 in position. Generally, about 50 psi is maintained with additional pressure being required when thick face sheets 38 and 40 are used. Thereafter sufficient pressurized inert gas is introduced between the core sheets 44 and 46 to cause them and the doubler strips 50 and 50a to balloon outwardly except where connected together by the welds 54. As shown in FIGS. 10 and 11, the core sheets 44 and 46 and the doubler strips 50 and 50a continue to balloon outwardly until first the core sheets 44 and 46 and then the doubler strips 50 and 50a contact and diffusion bond to the face sheets 38 and 40. Since the doubler strips 50 and 50a must contact the face sheets 38 and 40 and become bonded thereto before webs are substantially formed, the width of the doubler strips 50 and 50a need to be about the expected height of the web 42 being formed, since each doubler strip doubles over and assists in forming half of a web 42. This allows contact to be made with the face sheet 38 or 40 so that the doubler strips 50 and 50a form and stretch with the core sheet 44 or 46 as a web 42 is being formed. The core sheets 44 and 46, and the doubler strips 50 and 50a continue to balloon until the doubler strips 50 and 50a fold over the welds 54 with the core sheets 44 and 46 following to form the relatively thick webs 42 and relatively thin webs 52 where doubler strips 50 are not present. The thin strips 53a and 53b form and diffusion bond together about the wires 37 but not to the wires 37 to mechanically bond thereto by forming integral structure thereabout.

Figure 12:
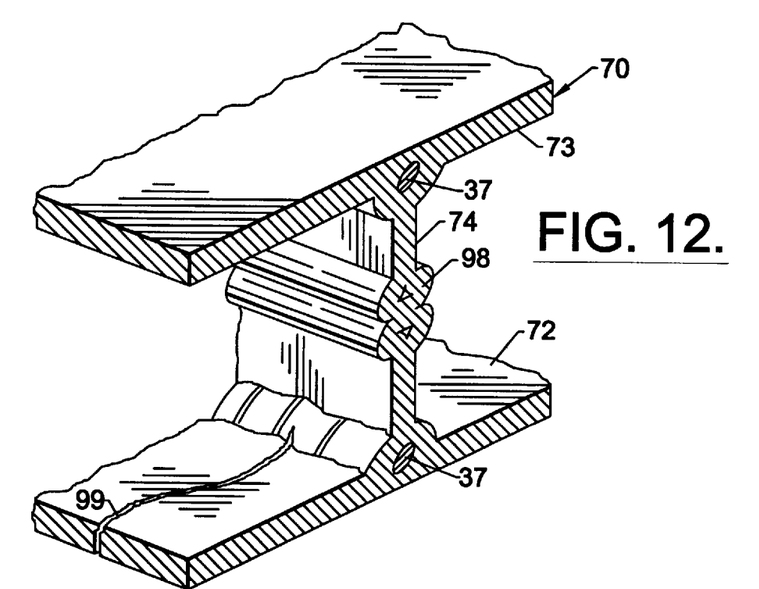
FIG. 12 is a perspective cross-sectional view of a panel similar to that of FIG. 2 without doubler reinforcements where reinforcement wires run parallel to the webs.
Figure 13:
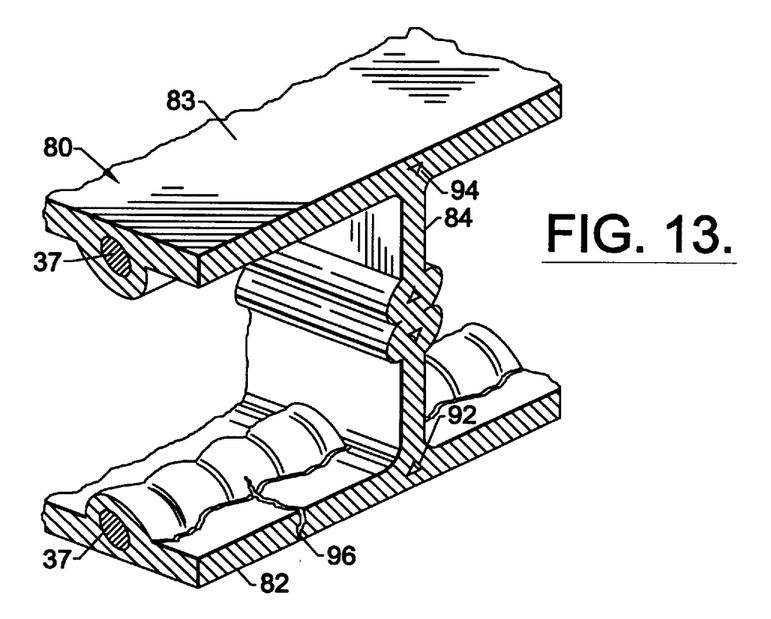
FIG. 13 is a perspective cross-sectional view of a panel similar to that of FIG. 12 where the reinforcement wires run transverse to the webs.
Figure 14:
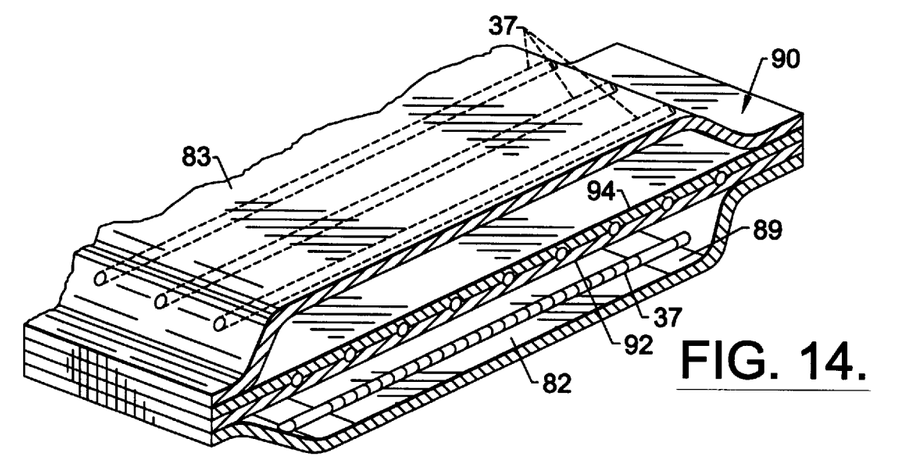
FIG. 14 is a perspective cross-sectional view of a forming pack for a panel similar to that of FIG. 13.

The doubler strips 50a are not required to embed the reinforcing wires 37 in the face sheets of a panel structure. For example, the panel 70 of FIG. 12 shows wires 37 embedded in one of the face sheets 72 and 73 parallel to the web 74 whereas the panel 80 of FIG. 13 shows a reinforcing wire 37 in one of the face sheets 82 and 83 at right angles to the web 84. The panels 70 and 80 can be made by retaining the wires 37 to the face sheets with strips of titanium foil 89, as shown in FIG. 14. In FIG. 14, the formed face sheets 82 and 83 have been assembled in a forming pack 90 with core sheets 92 and 94 used to form the panel 70. When the core sheets 92 and 94 are formed into webs 84, they flow over the wires 37 to mechanically encase them so any crack 96 growing transversly thereto is stopped thereby. The panel 70 is constructed in the same manner with the wires 37 retained parallel to the web welds 98 so that they likewise are encapsulated in the face sheets 72 and 73 for stopping cracks 99 transverse to the webs 74. The wires 37 may be part of a mesh to provide crack retardation for cracks 96 and 99. The mesh may have its wires orientated as in panels 70 and 80 (parallel and perpendicular to the webs) or at angles thereto.

Figure 15:
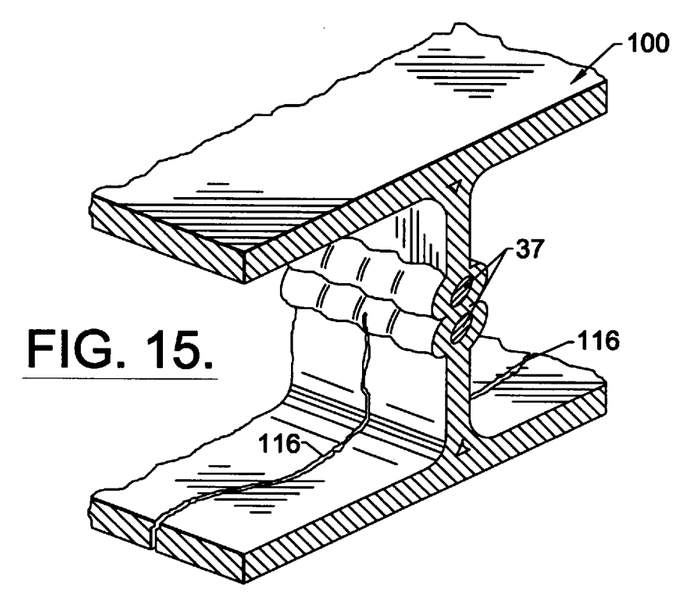
FIG. 15 is a perspective cross-sectional view of a panel similar to that of FIG. 12 where the reinforcement wires run centrally within the webs.
Figure 16:
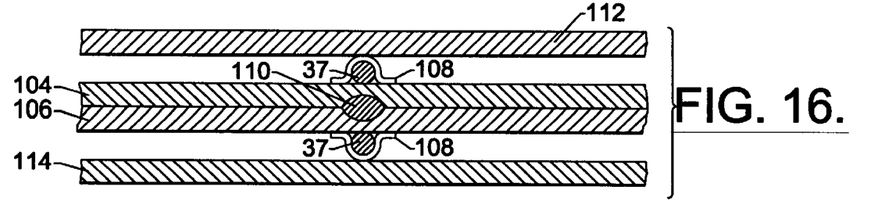
FIG. 16 is an enlarged cross-sectional view of the portion of the forming pack for the panel of FIG. 15.
Figure 17:
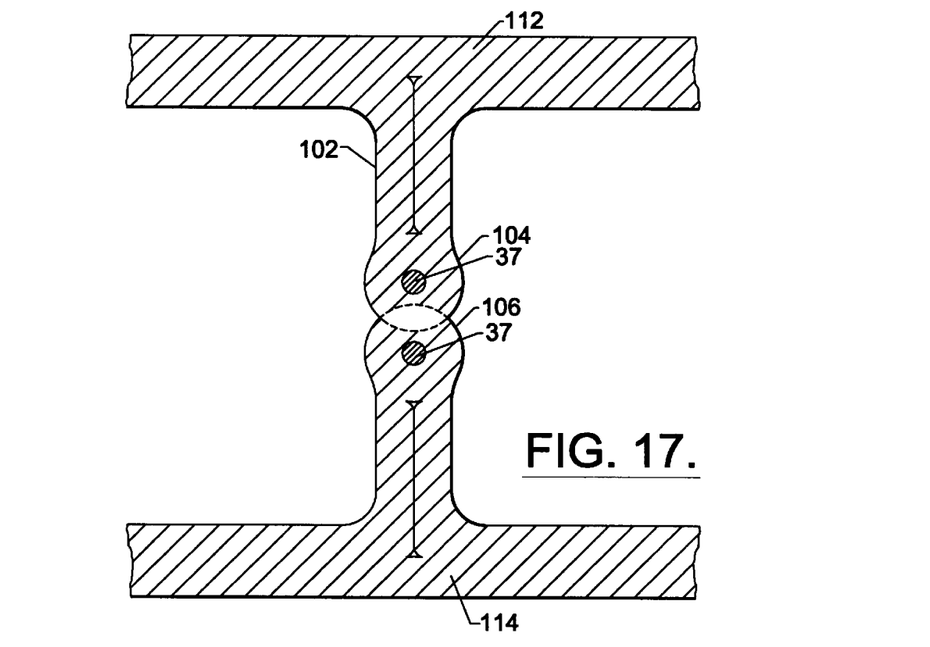
FIG. 17 is an enlarged cross-sectional view of the panel formed with the forming pack of FIG. 16.

The panel 100 of FIGS. 15, 16, and 17 includes reinforcing wires 37 in the center of the web 102. The panel 100 is constructed by retaining the wires 37 to the core sheets 104 and 106 with titanium foil strips 108 that can be located at the ends of the wires 37 in places anywhere along the wires 37, since the strips 108 diffusion bond into the panel 100 to become an integral part thereof. The wires 37 are positioned adjacent the welds 110 used to hold the core sheets 104 and 106 together to form the webs 102. The panel 100 is formed by forming the face sheets 112 and 114 first and then expanding the core sheets into the webs 102. The location of the wires 37 initially results in them being positioned centrally in the webs 102 so they can stop a crack 116 through a face sheet 114 before it can grow completely through a web 102.

Figures 18, 19:
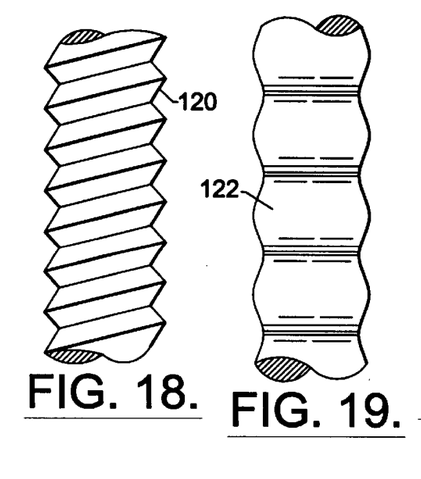
FIGS. 18, 19, and 20 are enlarged side views of a portion of a reinforcement member, ideally constructed from a high strength, high modulus material such as steel or boron.
Figures 20, 21:
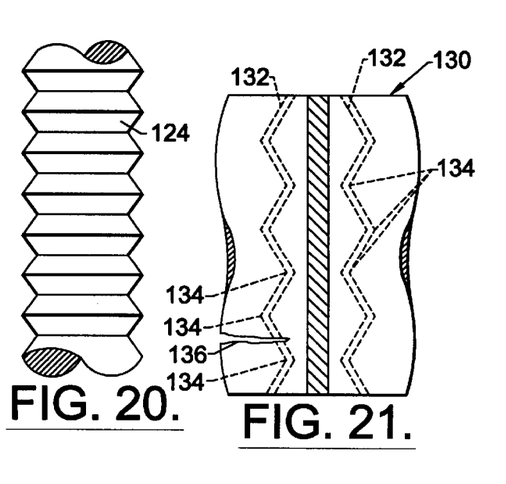
FIG. 21 is a top cross-sectional view of the a panel formed with non-linear reinforcement members embedded in a face sheet.

Although, heretofore, the reinforcing members have been referred to as wires, as shown in FIGS. 18, 19, and 20, they may be threaded rods 120, rolled rods 122 or cut rods 124 constructed from metallic or non-metallic materials that do not diffusion bond. What is important is that the reinforcing members have a varying cross-section or curvature so the above mentioned mechanical attachment, as opposed to a bonded attachment can take place. FIG. 21 is a top cross-sectional view of a portion of a panel 130 where smooth high modulus fibers 132 were bent and held down by titanium foil strips before the panel 130 was formed around them. The bends 134 provide the means for mechanical attachment so the fibers 132 can take on load to prevent further growth of the crack 136.

Figure 22:
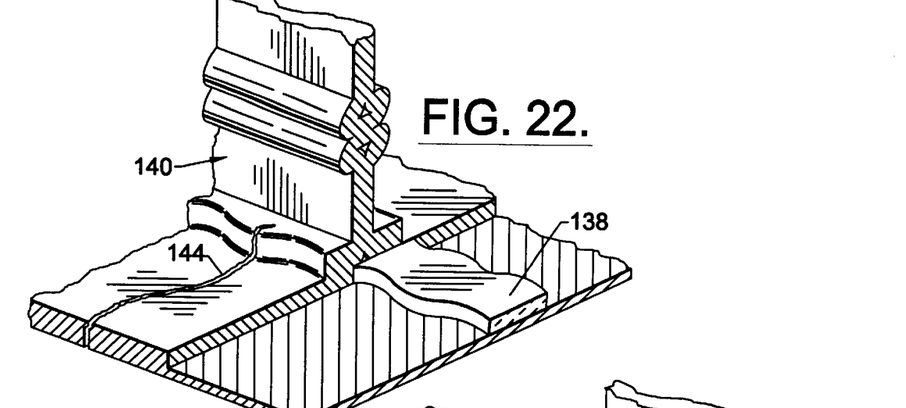
FIG. 22 is a perspective cross-sectional view of a panel with a non-diffusion bondable non-constant cross-section strip as the reinforcement member.

The structural members can also be non-diffusion bondable, non-constant cross-section strips 138 as is shown embedded in the panel 140 of FIG. 22 stopping crack 144. The panel 140 is constructed like panel 70 with the strips 142 substituted for the wires 37. The wires also may be exotic materials, such as silicon carbide fibers, so long as the exotic material remains stable at SPF/DB temperatures.

Figures 23, 24:
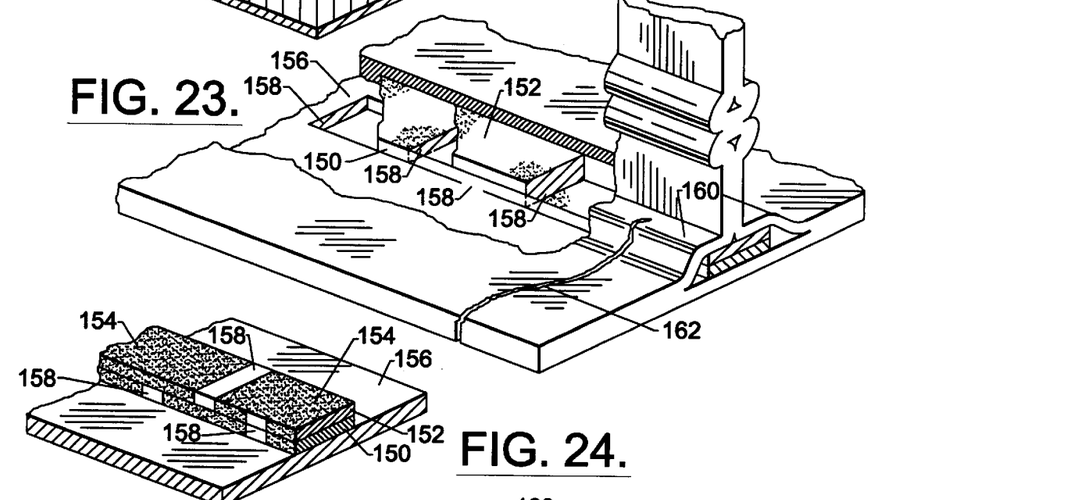
FIG. 23 is a perspective cross-sectional view of a panel with a diffusion bondable strip pair as the reinforcement member embedded therein.
FIG. 24 is a perspective cross-sectional view of a portion of the diffusion bondable strip pair shown in FIG. 23.

It is also possible to practice the invention using reinforcing strips 150 and 152 (FIG. 24) that readily diffusion bond to the panels. Strips 150 and 152 are advantageous, because they allow use of the same material in the reinforcing strips as in the panels, which eliminates unequal thermal expansion problems that occur with different materials. The strips are prepared with alternating areas prevented from diffusion bonding through the use of maskant 154. Usually maskant is difficult to precisely place, but on straight flat strips 150 and 152, application of maskant, usually with silk screen techneques, can be precise. The strips 150 and 152 are positioned on a face sheet 156 so that none of the unmasked areas 158 are in alignment with each other. Then the SPF/DB process, like for panel 70, is performed so that the core sheets 160 can envelop the strips 150 and 152 and diffusion bond thereto in the unmasked areas 158. The same thing occurs at the areas 158 where they contact the face sheet 156. The two strips 150 and 152 act in concert to prevent cracks 162 from growing therepast.

Figure 25:
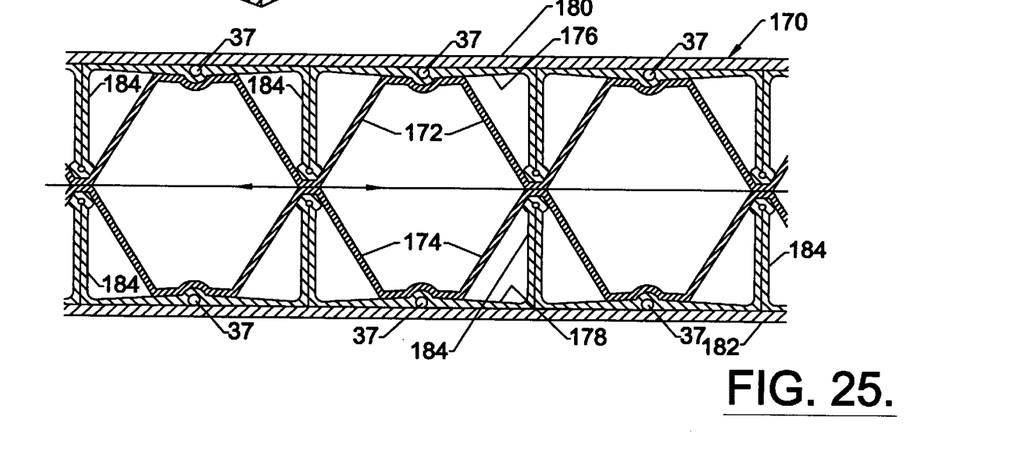
FIG. 25 is a cross-sectional view of an SPF/DB six-sheet panel structure with diagonal reinforcing webs constructed with the present reinforcement members embedded in the panel.

The present invention is also useful in the construction of more complex panels, such as the diagonally reinforced web SPF/DB panel 170 shown in FIG. 25. The panel 170 is similar to panel 70 except that two additional core sheets 172 and 174 are added to the assembly 175 between core sheets 176 and 178 and face sheets 180 and 182, resulting in a six sheet process that forms a panel 170 with reinforcement wires 37 embedded therein. The diagonal webs 172 and 174 create an efficient panel 170, much more resistant to shear loads than panels 64 constructed with only vertically positioned parallel webs 66.

Figure 26:
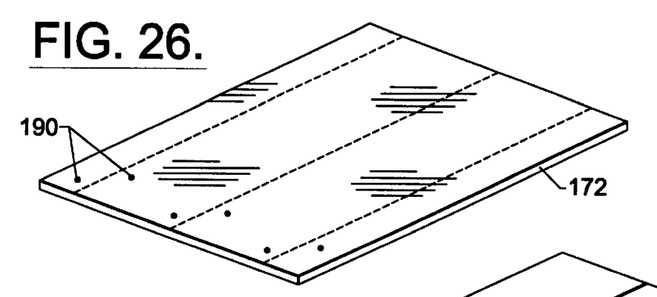
FIG. 26 is a perspective view of one of the two inner core sheets used to form the structure of FIG. 25 with gas passages and the position of the webs of the longitudinal cell structures to be formed shown.
Figure 27:
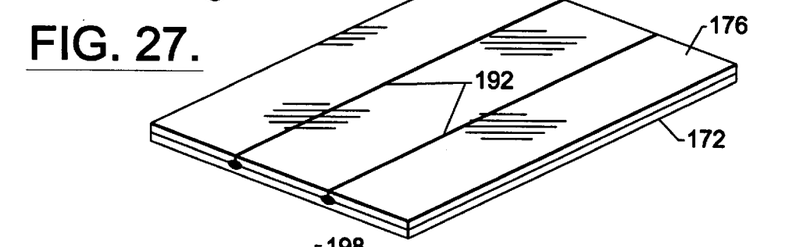
FIG. 27 is a perspective view of one of two inner pairs of core sheets including the sheet of FIG. 26 used to form the structure of FIG. 25 with the welds holding them together shown.
Figure 28:
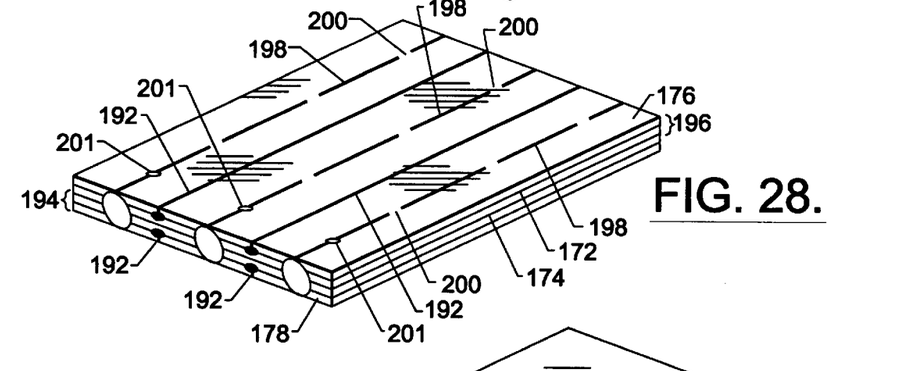

Various configurations of diagonally reinforced SPF/DB panel structures are possible. The basic fabrication process is relatively simple and similar to other multi-sheet SPF/DB panels. The panel 170 is constructed by first forming gas passageways 190 in core sheets 172 and 174 as shown with sheet 72 in FIG. 26. Thereafter as shown in FIG. 27, sheets 172 and 176 and 174 and 178 are rollseam welded together. The rollseam welds 192, so created, become the diagonal web attachment lines at the face sheets after forming. As shown in FIG. 28, the two welded subassemblies 194 and 196 made from sheets 172 and 176, and 174 and 178 respectively, are placed on top of each other with the weld lines 192 aligned. The subassemblies 194 and 196 are then intermittently rollseam welded together to form intermittent welds 198, which become the centers of vertical web locations. After forming, the interruptions 200 in the welds 198 become gas passages during the forming operation that allow gas pressure to equalize within the core of the panel 170. One or more holes 201 can be formed through the welds 198 to provide gas passages at right angles to the weld interruption gas passages 200 from face sheet 180 to face sheet 182 across the core.

Figure 29:
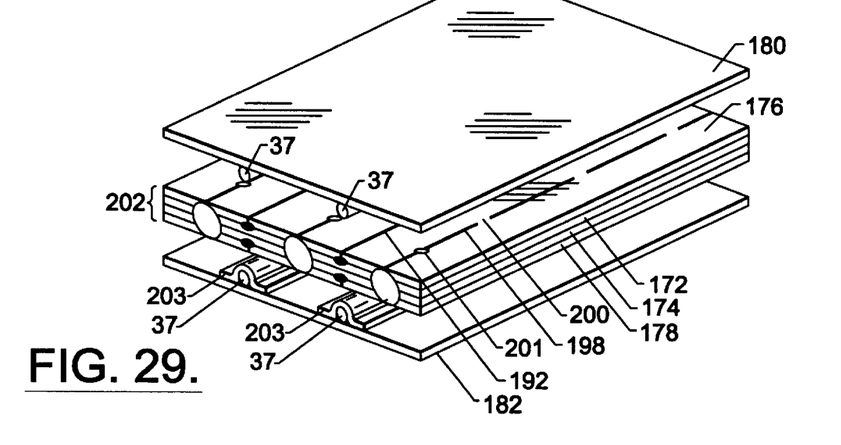
FIG. 29 is a perspective view showing how the face sheets are assembled to the welded core assembly of FIG. 28 with reinforcement wires positioned on the face sheets.
Figure 30:
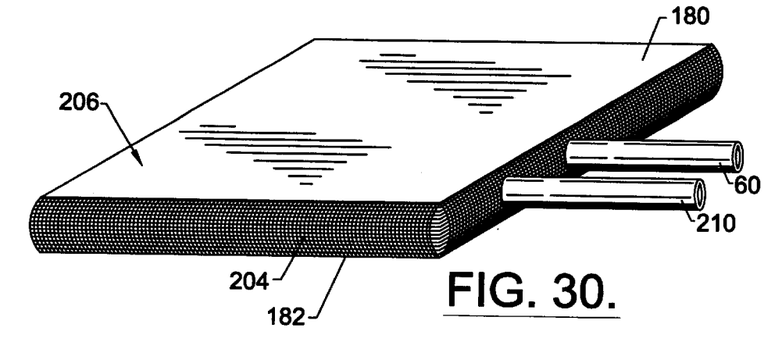
FIG. 30 is a perspective view of the forming pack assembly used to form the panel of FIG. 25.
Figure 31:
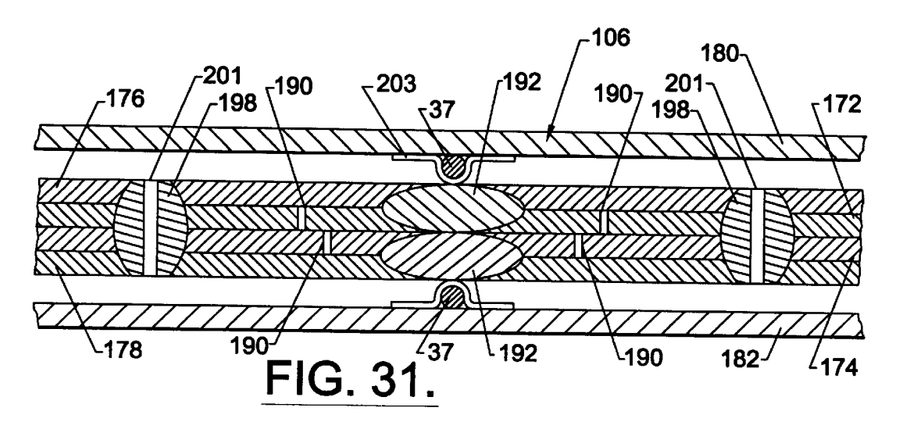
FIG. 31 is an enlarged cross-sectional view of a portion of the panel assembly of FIG. 30 with uni-directional cells.
Figure 32:
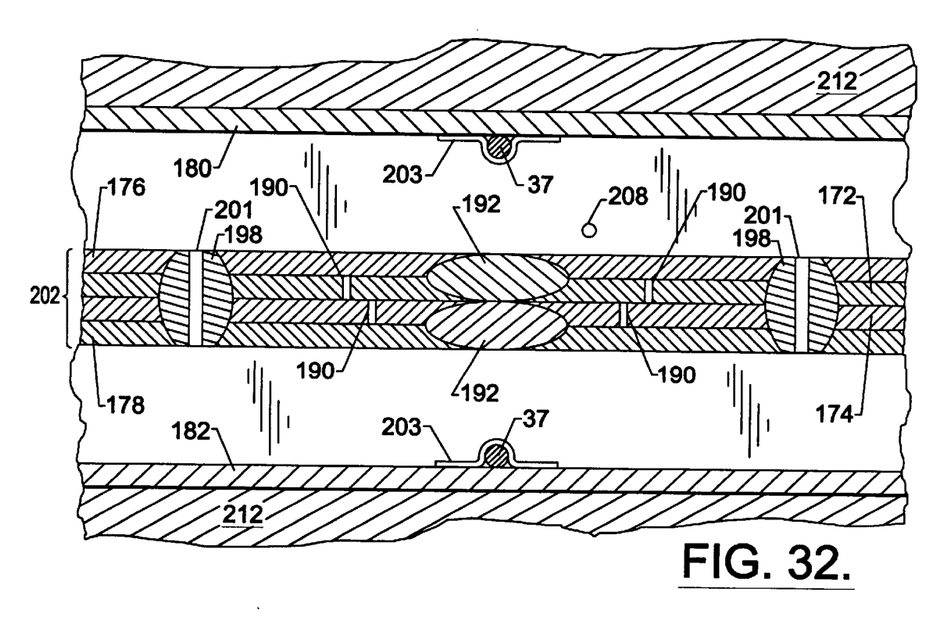
FIG. 32 is a cross-sectional view of the portion of the panel assembly of FIG. 31 in a hot die with the face sheets formed.
Figure 33:
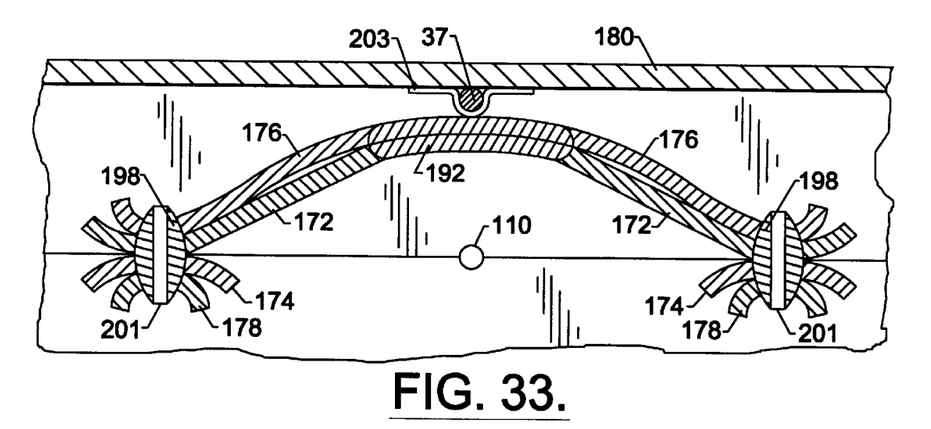
FIG. 33 is a cross-sectional view of the upper half of the portion of the panel assembly of FIG. 32 with the inner core partially formed.
Figure 34:
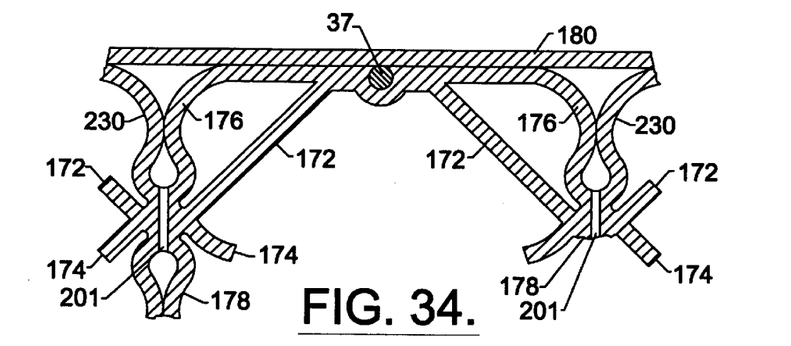
FIGS. 34 and 35 are a cross-sectional view similar to FIG. 33 illustrating the core forming.
Figure 35:
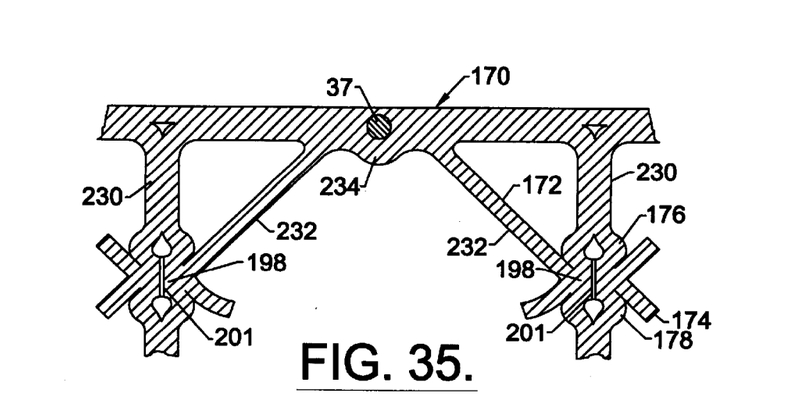
Figure 36:
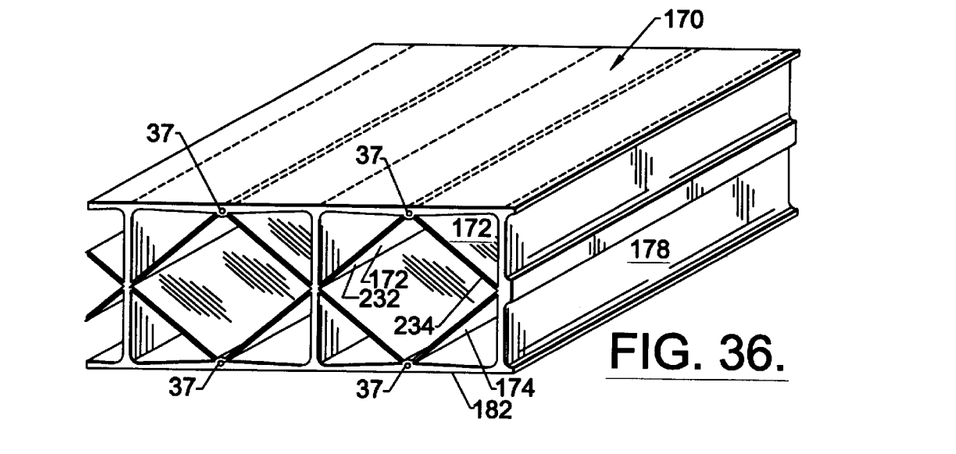
FIG. 36 is a perspective cross-sectional view of a panel structure of FIG. 35 constructed according to the present invention.

As shown in FIG. 29, the face sheets 180 and 182 with the reinforcement wires 37 attached in alignment with the welds 192 are then added to the core assembly 202. As before, the wires 37 are attached to the face sheet by welded titanium foil strips 203. As shown in FIG. 30, the edges 204 of the complete panel assembly 206 are then sealed by welding. Two gas transmission tubes, 208 and 210, are positioned to extend out of the edges 204 the during the edge forming operation. Tube 208 forms a gas passageway into the volume between either the face sheet 180 or 182 and the core assembly 202, which is connected to the other face sheet/core assembly volume by the hole 201, while tube 210 forms a gas passageway to the interior of the core assembly 202. The welded panel assembly 206, a portion being shown in an enlarged form in FIG. 31, is then placed in a forming die and superplastically formed and diffusion bonded in a hot press. This accomplished by first heating the assembly 206 and then introducing pressurized inert gas between the face sheets 180 and 182 and the core assembly 202, which causes the face sheets 180 and 182 to form equally out against the die 212 because the pressure equalizes through the holes 201. The interior of the core assembly 202 is also pressurized to just above the face sheet forming pressure during the period of face sheet formation to prevent the sheets 172, 174, 176 and 178 from undesirably diffusion bonding together. Thereafter, the pressure between the face sheets 80 and 82 and the core assembly 202 is maintained by bleeding off inert gas while a controlled gas-mass flow of inert gas is fed through tube 210 to pressurize the interior of the core assembly 202. This causes sheets 176 and 178 to superplastically form outwardly as shown in FIG. 33 while sheets 172 and 174 are strained laterally and maintained planar as shown. The welds 192 tend to stiffen the outer areas of the ballooning sheet 176 and as can be seen in FIG. 33, the welds 192 curve only slightly. FIGS. 34 and 35 show the vertical webs 230 symmetrically forming and diffusion bonding into planar vertical webs 230 with diagonal planar supporting webs 232 extending from the weld area 198 to the face sheet 180 until, as shown in FIGS. 35 and 36, all of the sheets diffusion bond together into the integral panel 170 with reinforcement wires 37.

Figure 37:
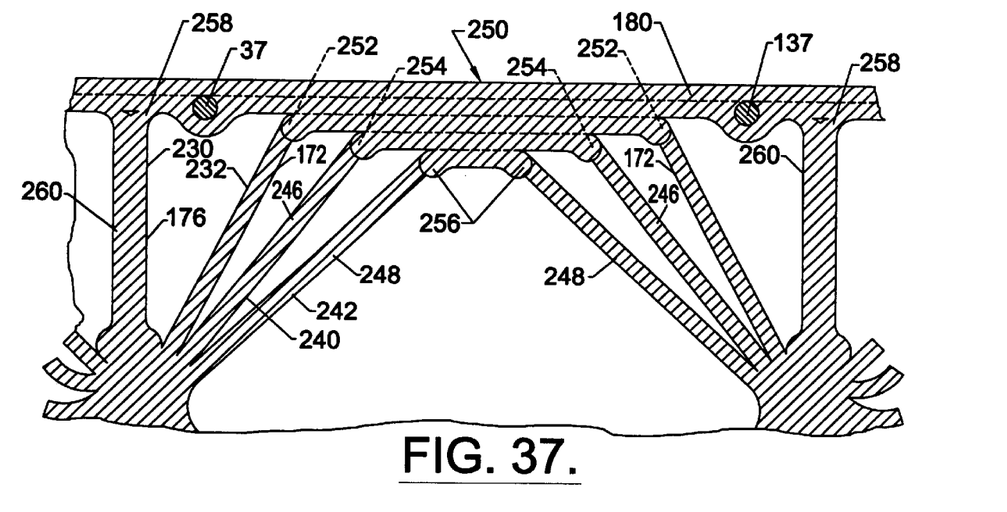
FIG. 37 is a cross-sectional view similar to FIG. 35 of a modified, structure having multiple diagonal reinforcing webs and embedded reinforcement wires.

By adding additional diagonal web sheets 240 and 242 through the center of the original core assembly, additional diagonal reinforcing webs 246 and 248 can be formed to generate the panel 250, a portion of which is shown in FIG. 37. To obtain the needed separation at the face sheet 180, the new sheets 240 and 242 are welded to the outer core sheet 176 with spaced welds 252, 254, and 256, whose spacing is reduced as shown in FIG. 38 to provide separation. The area of the welds is so stiff that the wires might not become properly mechanically connected. Therefore the wires 37 are located near the bases 258 of the vertical webs.

Thus, there has been shown and described novel SPF/DB structures with selectively thicker webs for areas of high compressive stress and the processes by which they are made which fulfill all of the objects and advantages sought therefor. Many changes, alterations, modifications and other uses and applications of the subject invention will become apparent to those skilled in the art after considering the specification together with the accompanying drawing. All such changes, alterations and modifications which do not depart from the spirit and scope of the invention are deemed to be covered by the invention which is limited only by the claims that follow.

What is claimed is:

1. A superplastically formed, diffusion bonded panel having:
   a first face sheet;
   a second face sheet separated from said first face sheet;
   at least one first separator web positioned generally perpendicular to said first and second face sheets and connected to said face sheets to maintain the separation thereof, each said first separator web having:
      first and second sides; and
      a centerline bulge there along generally centered between said first and second face sheets and extending from said first and second sides; and
   at least one reinforcement member connected in the panel having:
      at least portions thereof that are not bonded thereto, said at least one reinforcement member being for retarding the growth of a crack growing transverse thereto.

2. The SPF/DB structural panel as defined in claim 1 wherein said at least one reinforcement member is embedded in said panel.

3. The SPF/DB structural panel as defined in claim 1 wherein said at least one reinforcement member is embedded in said centerline bulge.

4. The SPF/DB structural panel as defined in claim 1 wherein said at least one reinforcement member is embedded in said first face sheet in alignment with at least one first separator web.

5. The SPF/DB structural panel as defined in claim 1 wherein said at least one reinforcement member is embedded in said first face sheet generally perpendicular to said first separator web.

6. The SPF/DB structural panel as defined in claim 1 wherein said at least one reinforcement member is embedded in said first face sheet generally parallel to said first separator web.

7. The SPF/DB structural panel as defined in claim 1 wherein said at least one reinforcement member includes:
   a plurality of strips connected together and to said first face sheet only at discrete non-aligned locations.

8. The SPF/DB structural panel as defined in claim 1 wherein said panel is primarily constructed from titanium, and said at least one reinforcement member is embedded in said panel, is constructed from material that does not readily diffusion bond to titanium at titanium diffusion bonding temperatures, and is an elongate member having:
   a non-constant cross-section for mechanical connection to said panel when embedded therein.

9. The SPF/DB structural panel as defined in claim 1 wherein said panel is primarily constructed from titanium, and said at least one reinforcement member is a mesh of elongate members embedded in said panel, said elongate members being constructed from material that does not readily diffusion bond to titanium at titanium diffusion bonding temperatures.

10. A superplastically formed, diffusion bonded panel having:
    a first face sheet;
    a second face sheet separated from said first face sheet;
    at least one first separator web positioned between said first and second face sheets and integrally connecting said face sheets while maintaining the separation thereof, said first separator web having:
       first and second sides; and
    at least one reinforcement member embedded in the panel but not bonded thereto, said at least one reinforcement member having a cross-section that varies in a lengthwise extending direction so that said at least one reinforcement member is mechanically attached to the panel said at least one reinforcement member being for retarding the growth of a crack growing transverse thereto.

11. The SPF/DB structural panel as defined in claim 10 wherein said panel is primarily constructed from titanium, and said at least one reinforcement member is a mesh of elongate members embedded in said panel, said elongate members being constructed from material that does not readily diffusion bond to titanium at titanium diffusion bonding temperatures.

12. The SPF/DB structural panel as defined in claim 10 wherein said at least one reinforcement member is embedded in said first face sheet of said panel.

13. The SPF/DB structural panel as defined in claim 10 wherein said at least one first separator web includes:
    a central bulge extending generally parallel to said face sheets, said at least one reinforcement member being embedded in said centerline bulge.

14. The SPF/DB structural panel as defined in claim 10 wherein said at least one reinforcement member is two reinforcement members embedded in said first face sheet in alignment with said first separator web.

15. The SPF/DB structural panel as defined in claim 10 wherein said at least one reinforcement member is embedded in said first face sheet generally perpendicular to said first separator web.

16. The SPF/DB structural panel as defined in claim 10 wherein said at least one reinforcement member is embedded in said first face sheet generally parallel to said first separator web.

17. The SPF/DB structural panel as defined in claim 10 wherein said at least one reinforcement member includes:
    a plurality of non-constant section strips.

18. The SPF/DB structural panel as defined in claim 10 wherein said panel is primarily constructed from titanium, and said at least one reinforcement member is embedded in said panel, is constructed from material that does not readily diffusion bond to titanium at titanium diffusion bonding temperatures, and is an elongate member having:
    a non-constant cross-section for mechanical connection to said panel when embedded therein.

19. The SPF/DB structural panel as defined in claim 10 wherein each said first separator web is positioned generally perpendicular to said first and second face sheets and has:
    a first average distance between said first and second sides; and
    a centerline bulge there along generally centered between said first and second face sheets and extending from said first and second sides, said panel further including:
       at least one second separator web positioned generally perpendicular to said first and second face sheets and connected to said face sheets to maintain the separation thereof, each said second separator web having:
- first and second sides;
- a second average distance between said first and second sides larger than said first average distance; and
- a centerline bulge there along generally centered between said first and second face sheets and extending from said first and second sides.

20. The SPF/DB structural panel as defined in claim 19 wherein said panel further includes:
- a butt joint edge;
- a plurality of second separator webs positioned along said butt joint edge;
- a plurality of first separator webs positioned spaced from said butt joint edge;
- a first doubler plate positioned adjacent said first face sheet opposite said second separator webs;
- a second doubler plate positioned adjacent said second face sheet opposite said second separator webs;
- aligned holes through said doubler plates and said face sheets; and
- a plurality of fasteners extending through said aligned holes to retain said doubler plates to said face sheets.

21. The SPF/DB structural panel as defined in claim 19 further including:
- a first diagonal web extending between said first side of said centerline bulges and said first face sheet;
- a second diagonal web extending between said first side of said centerline bulges and said second face sheet;
- a third diagonal web extending between said second side of said centerline bulges and said first face sheet; and
- a fourth diagonal web extending between said second side of said centerline bulges and said second face sheet.

* * * * *